US00RE49798E

(19) United States
(12) Reissued Patent
Coote

(10) Patent Number: US RE49,798 E
(45) Date of Reissued Patent: Jan. 16, 2024

(54) ROLLING CAR SEAT

(71) Applicant: Kathy Coote, Stone Mountain, GA (US)

(72) Inventor: Kathy Coote, Stone Mountain, GA (US)

(21) Appl. No.: 17/722,625

(22) Filed: Apr. 18, 2022

Related U.S. Patent Documents

Reissue of:
(64) Patent No.: 8,544,941
Issued: Oct. 1, 2013
Appl. No.: 13/274,396
Filed: Oct. 17, 2011

U.S. Applications:
(60) Provisional application No. 61/462,979, filed on Feb. 10, 2011.

(51) Int. Cl.

| | |
|---|---|
| ***B60N 2/26*** | (2006.01) |
| ***B60N 2/28*** | (2006.01) |
| ***B60N 2/30*** | (2006.01) |
| ***A47D 1/06*** | (2006.01) |
| ***A47D 1/10*** | (2006.01) |
| ***B60N 2/32*** | (2006.01) |
| ***B62B 7/00*** | (2006.01) |
| ***B62B 7/02*** | (2006.01) |
| ***B62B 7/12*** | (2006.01) |
| *B62B 5/06* | (2006.01) |
| *B62B 9/20* | (2006.01) |

(52) U.S. Cl.
CPC ..... *B60N 2/2848* (2013.01); *B60N 2/2845* (2013.01); *B62B 7/006* (2013.01); *B62B 7/02* (2013.01); *B62B 7/12* (2013.01); *B62B 5/067* (2013.01); *B62B 9/20* (2013.01); *B62B 2205/14* (2013.01)

(58) Field of Classification Search
CPC .. B62B 7/006; B62B 7/02; B62B 7/12; B62B 7/10; B62B 7/105; B62B 9/20; B62B 5/067; B62B 2205/14; B60N 2/2845; B60N 2/2848; B60N 2/2842
See application file for complete search history.

(56) References Cited

U.S. PATENT DOCUMENTS

| | | | | |
|---|---|---|---|---|
| 3,659,865 | A * | 5/1972 | Nothacker | 297/118 X |
| 4,113,306 | A * | 9/1978 | von Wimmersperg | 297/130 X |
| 4,300,783 | A * | 11/1981 | Fisher | 297/129 X |
| 4,381,870 | A * | 5/1983 | Muellner | 297/118 X |
| 4,570,956 | A * | 2/1986 | Dyer | 297/130 X |
| 4,575,109 | A * | 3/1986 | Cowdery | 280/37 |
| 4,685,688 | A * | 8/1987 | Edwards | 297/130 X |

(Continued)

*Primary Examiner* — Patricia L Engle
(74) *Attorney, Agent, or Firm* — BEKIARES ELIEZER LLP

(57) ABSTRACT

A rolling car seat includes a car seat having back and seat portions configured to receive a seated child. A length-adjustable handle assembly is operatively coupled to the back portion and selectively movable between a retracted configuration not extending above a back portion upper end and an extended configuration extending above the back portion upper end. The rolling car seat includes a wheel assembly having a pair of spaced apart wheels operatively coupled to said the back portion and selectively movable between a withdrawn configuration adjacent said back portion rear surface and a deployed configuration displaced from the back portion rear surface.

12 Claims, 7 Drawing Sheets

(56) References Cited

U.S. PATENT DOCUMENTS 4,736,959 A * 4/1988 Van Steenburg ..... 297/130 X
4,762,331 A * 8/1988 Tucker et al. ..... B62B 7/12 280/30
4,822,064 A * 4/1989 Hunter ..... 280/30
4,845,804 A * 7/1989 Garrett ..... 16/19
4,872,692 A * 10/1989 Steenburg ..... 297/130 X
4,872,693 A * 10/1989 Kennel ..... 280/30
4,874,182 A * 10/1989 Clark ..... 297/130 X
4,878,680 A * 11/1989 Molnar ..... 297/130 X
4,896,894 A * 1/1990 Singletary ..... 280/30
4,902,026 A * 2/1990 Maldonado ..... 297/130 X
4,989,888 A * 2/1991 Qureshi et al. ..... 280/30
5,022,669 A * 6/1991 Johnson ..... B62B 5/02 280/47.38
5,104,134 A * 4/1992 Cone ..... 280/30
5,149,113 A * 9/1992 Alldredge ..... 297/130 X
5,318,311 A * 6/1994 Bofill ..... 280/30
5,527,089 A * 6/1996 Charest ..... 297/129
5,595,393 A * 1/1997 Batten ..... 280/30
5,829,826 A * 11/1998 Ziccardi ..... 297/118
5,899,467 A * 5/1999 Henkel ..... 297/129 X
5,988,657 A * 11/1999 Henkel ..... 297/129 X
6,237,995 B1 * 5/2001 Dierickx ..... 297/130
6,241,313 B1 * 6/2001 Lenz et al. ..... 297/217.1
6,296,259 B1 * 10/2001 Anderson ..... 280/30
6,367,821 B2 * 4/2002 Thiele ..... 280/30
6,612,645 B1 * 9/2003 Hsu ..... 297/130 X
6,729,630 B2 * 5/2004 Szmidt et al. ..... 280/47.25
6,854,744 B2 * 2/2005 Brandler ..... 280/30
6,910,696 B2 * 6/2005 Bargery et al. ..... 280/30
6,938,915 B2 * 9/2005 Bischoff et al. ..... 280/658
6,971,655 B1 * 12/2005 Harris ..... 297/250.1 X
6,976,685 B1 * 12/2005 King et al. ..... 280/30
6,986,518 B1 * 1/2006 Besaw ..... 280/30
7,011,316 B1 * 3/2006 Peridon ..... B62B 7/02 280/30
7,090,291 B2 * 8/2006 Birchfield ..... 297/118
7,100,976 B1 * 9/2006 Desalve ..... 297/129 X
7,293,792 B2 * 11/2007 Wilson ..... 280/647
7,311,353 B1 * 12/2007 Johnson ..... 297/130
7,350,857 B2 * 4/2008 Bishop ..... 297/129
7,354,049 B2 * 4/2008 Schmidt ..... 280/33.993
7,517,011 B2 * 4/2009 Aliev ..... 297/118
7,540,507 B1 * 6/2009 Kennedy ..... 280/30
7,543,886 B2 * 6/2009 Gutierrez-Hedges et al. ..... 297/118
7,600,766 B2 * 10/2009 Erskine ..... 280/47.25
8,128,103 B1 * 3/2012 Schutzendorf et al. .. 297/129 X
8,182,030 B1 * 5/2012 Britten ..... 297/129
9,308,839 B1 * 4/2016 Gleckler ..... B60N 2/2821
10,427,558 B1 * 10/2019 Dickens ..... B62B 7/006
2001/0009325 A1 * 7/2001 Thiele ..... B60N 2/286 280/648
2002/0060444 A1 * 5/2002 Cote ..... 280/648
2003/0015894 A1 * 1/2003 Bargery et al. ..... 297/118
2003/0209885 A1 * 11/2003 Szmidt ..... B60N 2/2806 280/47.27
2003/0227149 A1 * 12/2003 Budge ..... B62B 9/20 280/47.38
2004/0021353 A1 * 2/2004 Lozano et al. ..... 297/255
2004/0173997 A1 * 9/2004 Voll ..... A47D 13/02 280/655.1
2005/0099038 A1 * 5/2005 Hinds ..... 297/118
2009/0159385 A1 * 6/2009 Poissant et al. ..... 297/129 X
2010/0019547 A1 * 1/2010 Gray et al. ..... 297/118
2012/0205947 A1 * 8/2012 Coote ..... B62B 7/12 297/183.2
2012/0292952 A1 * 11/2012 Tyson, III ..... 297/129
2015/0091267 A1 * 4/2015 Conner ..... B62B 9/20 280/47.315
2017/0210406 A1 * 7/2017 Biesinger ..... B62B 5/067
2018/0009341 A1 * 1/2018 Carlile ..... B62B 9/20

* cited by examiner

ROLLING CAR SEAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATIONS

This application claims the priority of the provisional patent application Ser. No. 61/462,979 filed on Feb. 10, 2011 titled On the Go Car Seat and Stroller.

BACKGROUND OF THE INVENTION

This invention relates generally to infant car seats and, more particularly to a car seat having retractable wheels and a length adjustable handle such that the car seat may be pushed or pulled on the wheels when extended.

Children under a certain age and/or weight are required to ride in a special car seat properly positioned or strapped into the seat of a vehicle. Unfortunately, car seats have gotten very bulky and heavy and are, as a result, difficult or awkward to carry or move from vehicle to vehicle. Further, parents may desire to move a car seat to a location away from the vehicle to provide a comfortable and safe place for an infant or toddler to sit during an outing with the family, such as a picnic, sporting event, or the like. A parent may also desire to move both an infant and a car seat while in an airport, traveling in general, other commercial application, or the like. Even if the car seat is able to be carried to a location remote from the vehicle, the child will most likely need to be removed from the seat and carried to the final destination before being returned to the car seat.

Therefore, it would be desirable to have a car seat that is convenient to carry or move outside of or away from a vehicle. Further, it would be desirable to have a car seat having rollers or wheels on which the car seat may be rolled. In addition, it would be desirable to have a car seat having an extensible handle by which to pull or push the car seat when the wheels are deployed.

SUMMARY OF THE INVENTION

A rolling car seat according to a preferred embodiment of the present invention includes a car seat having back and seat portions configured to receive a seated child. A length-adjustable handle assembly is operatively coupled to the back portion and selectively movable between a retracted configuration not extending above a back portion upper end and an extended configuration extending above the back portion upper end. The rolling car seat includes a wheel assembly having a pair of spaced apart wheels operatively coupled to the back portion and selectively movable between a withdrawn configuration adjacent said back portion rear surface and a deployed configuration displaced from the back portion rear surface. The wheel assembly is automatically moved to the withdrawn configuration when the handle assembly is moved to the retracted configuration.

Therefore, a general object of this invention is to provide a rolling car seat that enables a user to move the car seat away from a vehicle without having to carry it.

Another object of this invention is to provide a rolling car seat, as aforesaid, having wheels on which the car seat may be pushed or pulled when transporting the car seat alone or with infants or toddlers seated therein.

Still another object of this invention is to provide a rolling car seat, as aforesaid, having a length adjustable handle by which to push or pull the car seat.

Yet another object of this invention is to provide a rolling car seat, as aforesaid, in which the wheels are movable between withdrawn and deployed configurations.

A further object of this invention is to provide a rolling car seat, as aforesaid, that is user-friendly to use.

A still further object of this invention is to provide a rolling car seat, as aforesaid, that meets regulatory standards.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a side view of the car seat as in FIG. 3a;

DESCRIPTION OF THE PREFERRED EMBODIMENT

Figure 1:
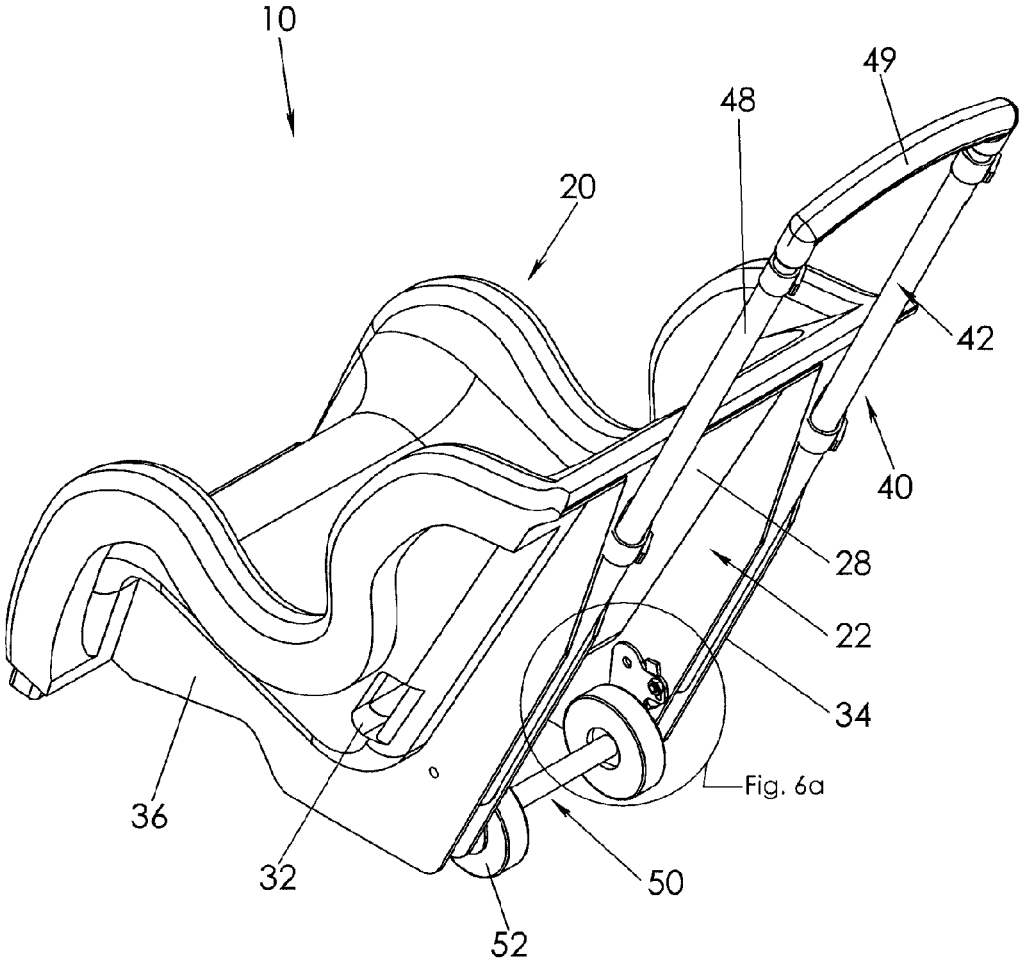
FIG. 1 is a rear perspective view of a rolling car seat according to a preferred embodiment of the present invention with the wheel assembly in a deployed configuration and the handle assembly in an extended configuration.

A rolling car seat according to a preferred embodiment of the present invention will now be described with reference to FIGS. 1 to 7b of the accompanying drawings. The rolling car seat 10 includes a car seat 20, a wheel assembly 50, a footrest 38, and a handle assembly 40.

In one embodiment, the car seat 20 includes a back portion 22 and a seat portion 36 extending forwardly from the back portion 22 in the manner of a chair. More particularly, the back portion 22 may include opposed upper 24 and lower 26 ends, the seat portion 36 extending forwardly from the back portion lower end 26. The car seat 20 may include a padded material situated on respective front surfaces of the back portion 22 and seat portion 36. The back portion 22 includes a rear surface 28. Preferably, the back portion 22 defines a recessed area 30 adjacent the lower end 26 thereof in which the wheel assembly 50 is housed at a withdrawn configuration as will be described in more detail below. The back portion 22 may also define seatbelt slots 32 configured to receive a vehicle seatbelt therethrough in order to mount the car seat 20 to a vehicle seat. In addition, the seat portion 36 may include a plurality of protection members (not numbered) that are configured to protect the front end of the seat portion 36 and prevent it from rolling.

In addition, the back portion 22 may also define opposed vertical handle channels 34 into which the handle assembly 40 may be received. The opposed handle channels 34 extend substantially between back portion upper 24 and lower 26 ends, each handle channel 34 being configured to receive handle members of the handle assembly 40. In some embodiments the handle assembly 40 may be viewed as extending directly out of a headrest. It should be noted that the handle channels 34 are shown in the drawings as openings in the back portion 22. This is only shown open for clarity and it is understood that the handle channels 34 are preferably formed inside the back portion 22 and are not open, except at upper ends thereof.

Figure 3A:
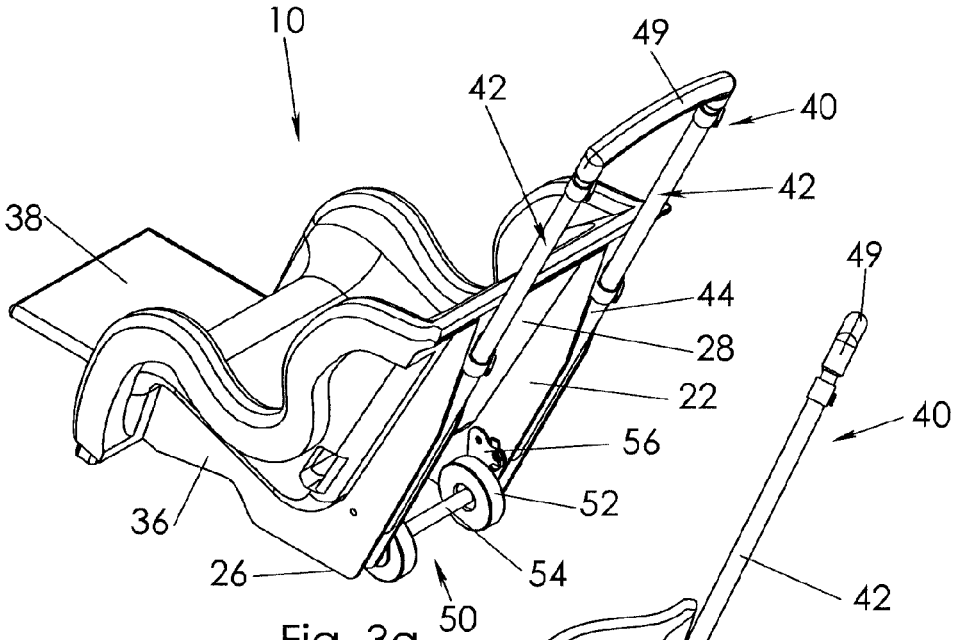
FIG. 3a is another rear perspective view of the car seat as in FIG. 1 with a footrest in an outwardly extended configuration.
Figure 3B:
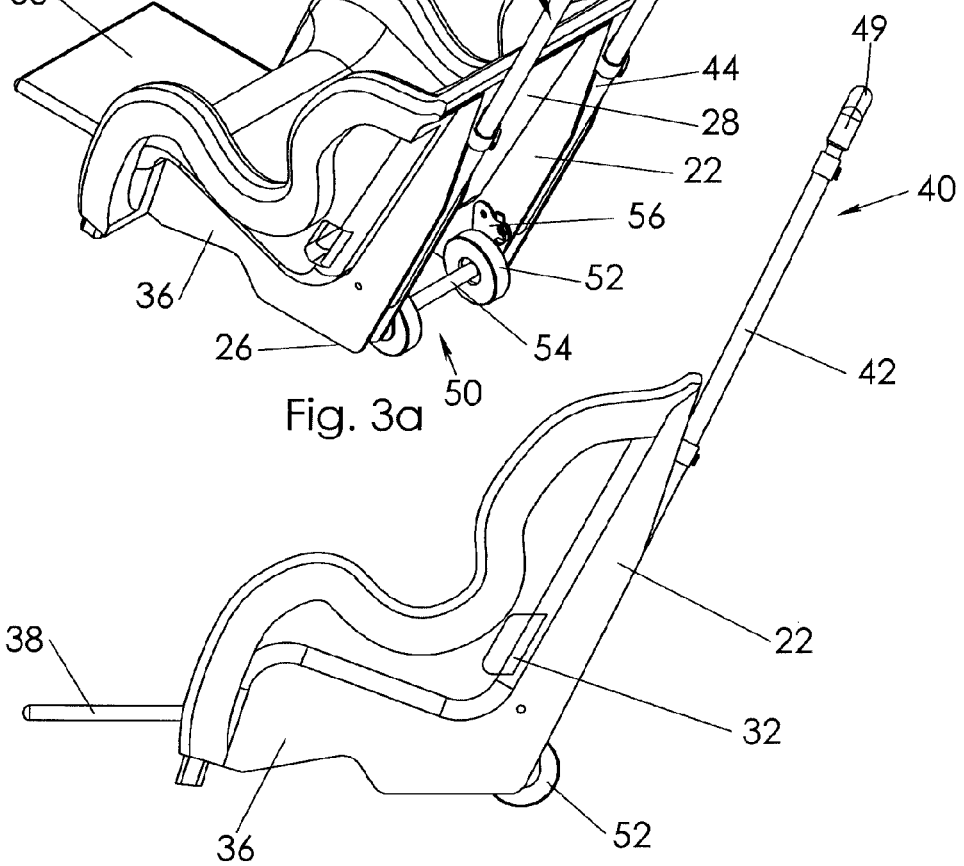
Figure 4:
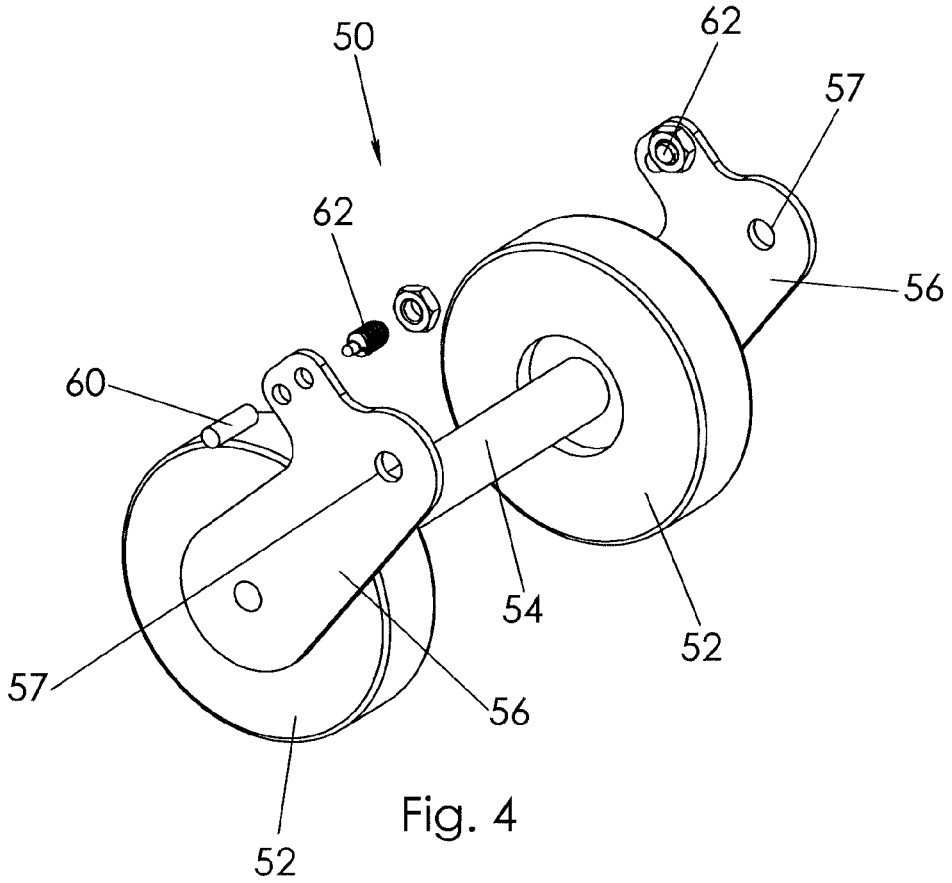
FIG. 4 is an exploded view of the wheel assembly removed from the rolling car seat.

The footrest 38 is a panel that is coupled to the seat portion 36 and movable between an inward configuration positioned inside the seat portion 36 (FIG. 1) and an outward configuration extending forwardly from the seat portion 36 (FIGS. 3a and 3b). More particularly, the footrest 38 is substantially inside the seat portion 36 at the inward configuration and is substantially outside the seat portion 36 at the outward configuration. The footrest also serves the function of not allowing the feet of taller children to reach the ground when the car seat is rolling and also not to allow children to push the car seat when it is at rest on the ground.

The handle assembly 40 is operatively coupled to the back portion 22 of the car seat 20. The handle assembly 40 is movable between a retracted configuration (FIG. 2) in which the handle assembly 40 does not extend upwardly above the upper end 24 of the back portion 22 and an extended configuration (FIG. 1) in which the handle assembly 40 extends upwardly above the upper end 24 of the back portion 22 as will be described below. The handle assembly 40 includes a plurality of handle members arranged in a telescopic configuration, the handle members 42 having appropriate diameters to be slidably arranged for movement in a moderate friction fit manner.

The handle members may be referred to later as having an outermost member 44, an innermost member 48, or an inner member although the handle assembly 40 may not necessarily be constrained to any particular number of telescopic segments. For instance, a handle bar 49 may extend between upper end of the innermost handle members 42 by which a user may urge the handle assembly 40 between extended and retracted configurations.

The wheel assembly 50 includes a pair of spaced apart wheels 52 operatively coupled to the car seat back portion 22 and interconnected by an axle 54. The wheel assembly 50 is selectively movable between a withdrawn configuration adjacent the back portion 22 and a deployed configuration extending rearwardly from the back portion 22. Preferably, the wheels 52 are situated in the recessed area 30 and not extending from the back portion at the withdrawn configuration and extending at least partially outside the recessed area 30 at the deployed configuration. It is understood that in some embodiments, the wheels may extend as wide as the car seat width or include wheels having an increased width so as to maximize stability. In addition, at least one wheel may include a wheel lock (not shown) that, when actuated, prevents the wheel from rotating. In some embodiments (not shown), the wheel assembly may include wheels that are fixed in the deployed configuration and are not movable between deployed and withdrawn configurations.

Figure 2:
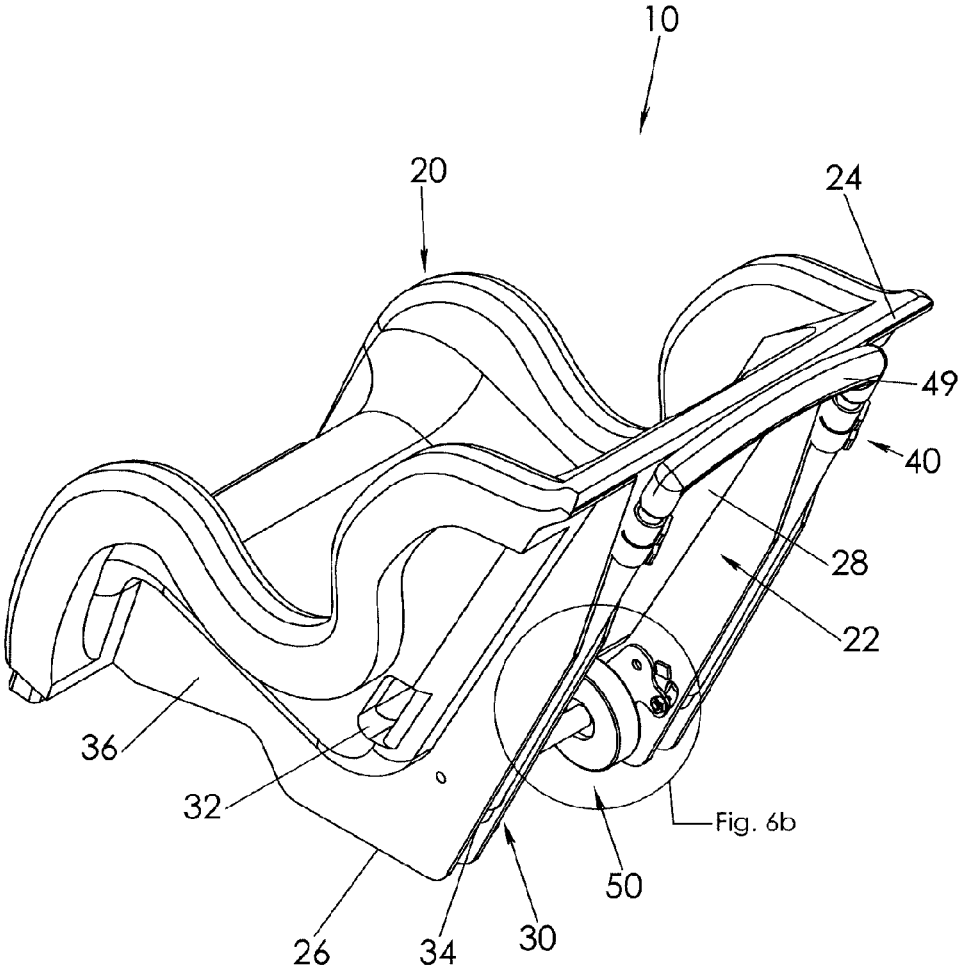
FIG. 2 is another rear perspective view of the car seat as in FIG. 1 with the wheel assembly in a withdrawn configuration and the handle assembly in a retracted configuration.

As will be described below in detail, the handle assembly 40 and wheel assembly 50 include structures that cause each other to move cooperatively between their respective configurations. For instance, the wheel assembly is at the withdrawn configuration when the handle assembly 40 is at the retracted configuration (FIG. 2). Even more particularly, the wheel assembly 50 is moved automatically to the withdrawn configuration when the handle assembly 40 is moved to the retracted configuration.

The wheel assembly 50 includes respective mounting members 56 (one associated with each wheel 52) pivotally coupled to the car seat back portion 22 at pivot point 57 and operatively coupled to a respective wheel 52. In this way, each wheel assembly 50 is operatively coupled to the car seat 20. A pivotal movement of each mounting member 56 at pivot point 57 causes the wheel assembly 50 to move between withdrawn and deployed configurations. For instance, the wheel assembly 50 is at the withdrawn configuration when the mounting members 56 are pivoted as shown in FIG. 2 and, on an enlarged scale, FIG. 6b. By comparison, the wheel assembly 50 is at the deployed configuration when the mounting members 56 are pivoted as shown in FIG. 1 and, on an enlarged scale, FIG. 6a.

Figure 6A:
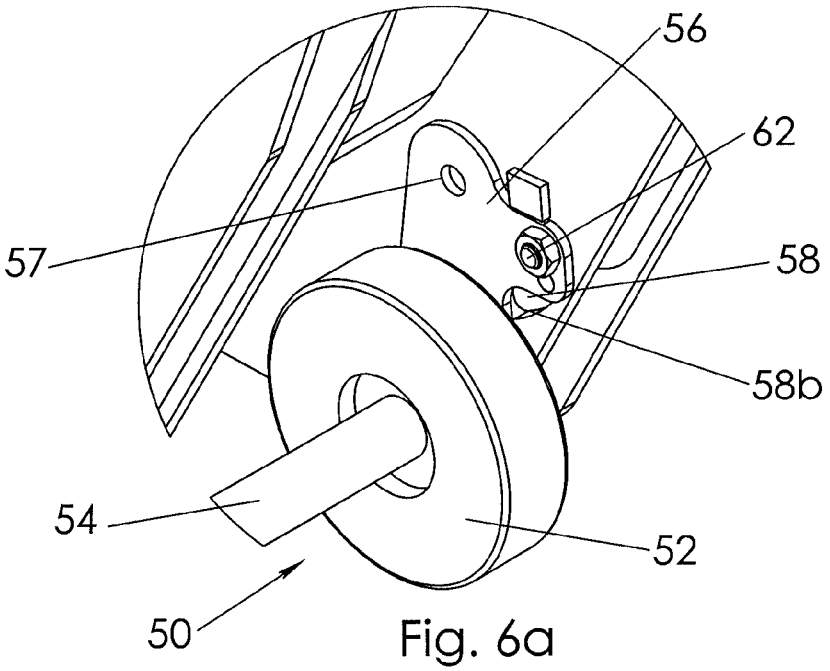
FIG. 6a is an isolated view on an enlarged scale taken from FIG. 1.
Figure 6B:
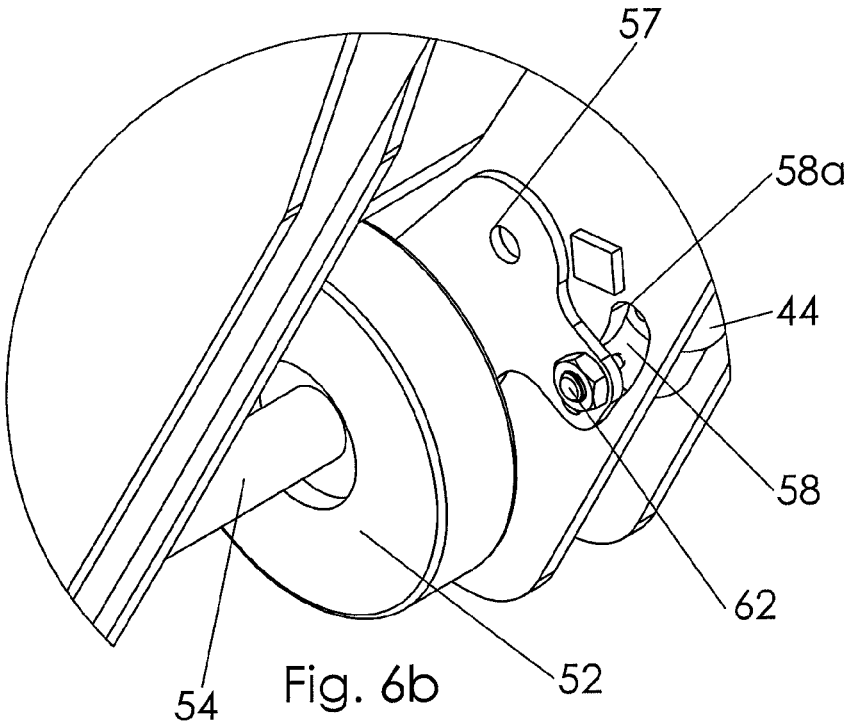
FIG. 6b is an isolated view on an enlarged scale taken from FIG. 2.
Figure 7A:
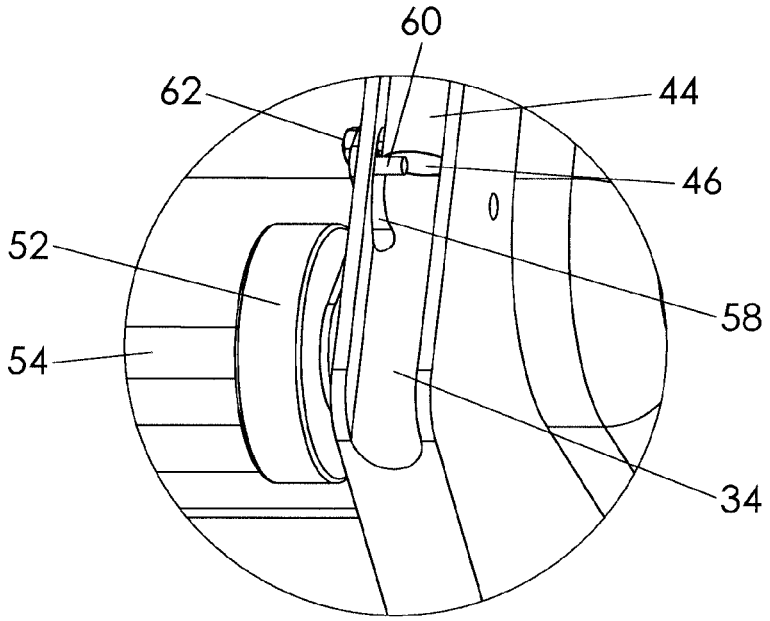
FIG. 7a is an isolated view on an enlarged scale taken from FIG. 5.

The back portion 22 of the car seat 20 may define an interlink channel 58 adjacent each mounting member 56 (FIGS. 6a and 6b). Each interlink channel 58 includes opposed upper 58a and lower 58b ends. A respective interlink channel 58 communicates a respective recessed area 30 with a respective handle channel 34. Each mounting member 56 includes a retraction pin 60 extending outwardly from an outside surface thereof and is configured to extend through a respective interlink channel 58 and into a respective handle channel (FIG. 7a). A retraction pin 60 is urged upwardly toward an upper end 58a of a respective interlink channel 58 when the mounting member 56 is pivoted to urge the wheel assembly toward the deployed configuration. The retraction pin 60 is urged downwardly toward a lower end 58b of a respective interlink channel 58 when the mounting member 56 is pivoted to urge the wheel assembly toward the withdrawn configuration.

Figure 5:
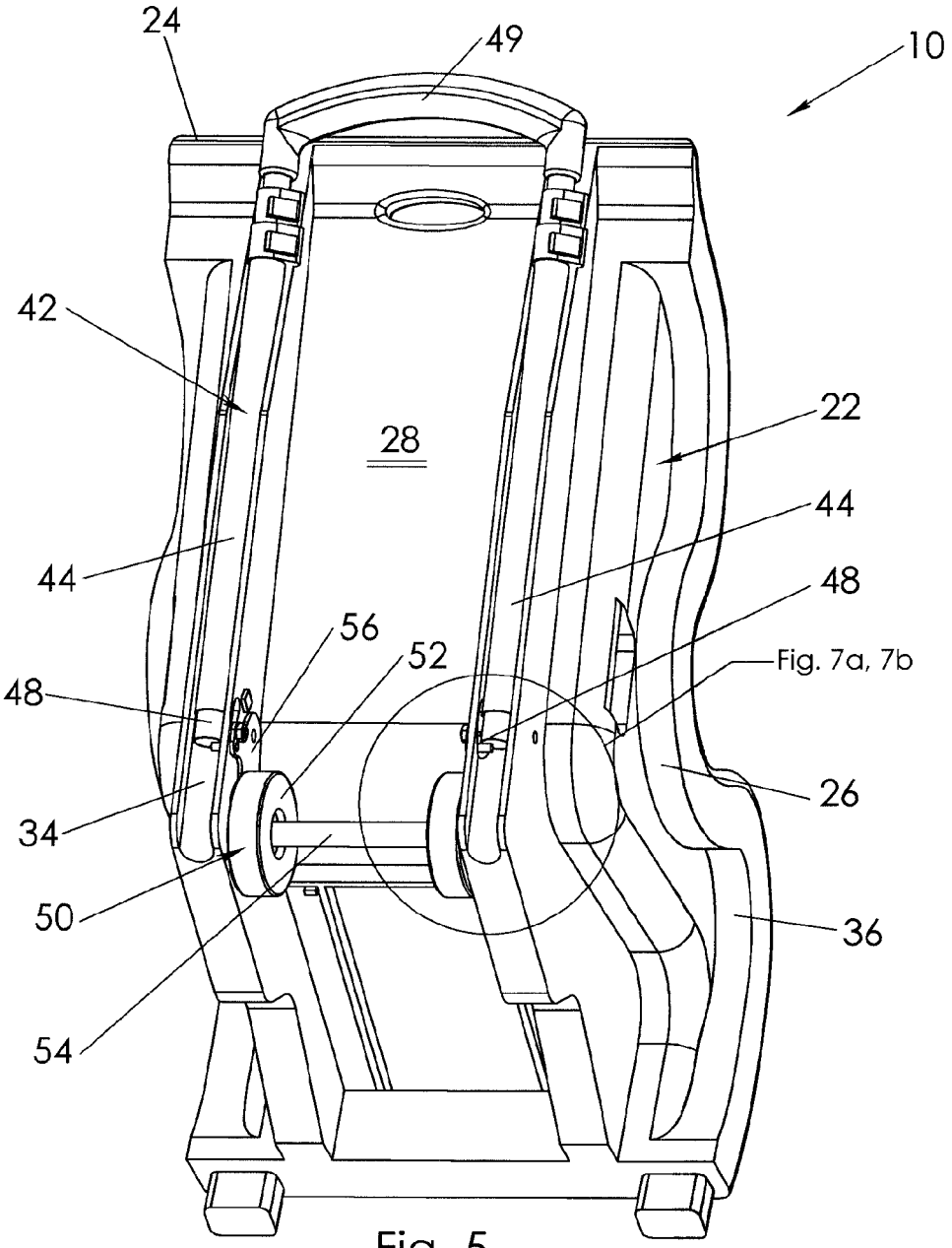
FIG. 5 is a perspective view taken from a lower rear angle of the car seat as in FIG. 1.
Figure 7B:
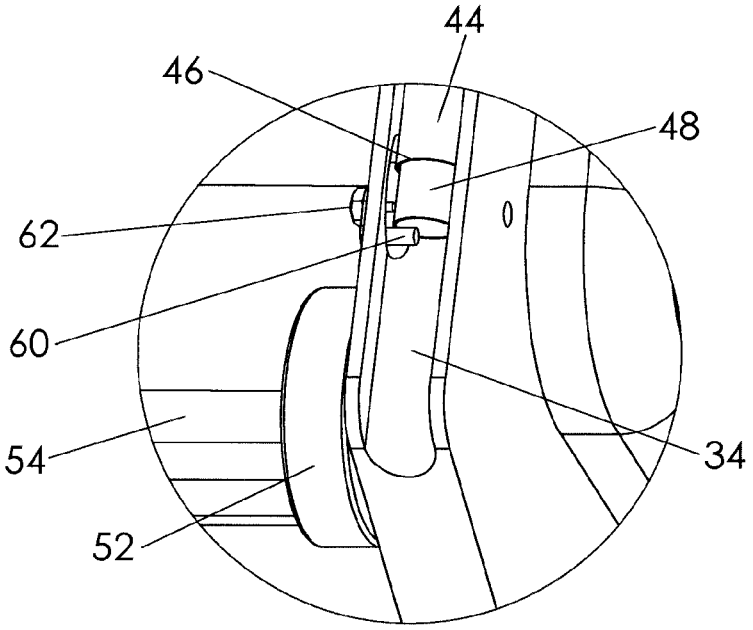
FIG. 7b is another isolated view on an enlarged scale taken from FIG. 5.

In further description of the linkage between the wheel assembly 50 and the handle assembly 40, the outermost/lowermost handle member 44 of the plurality of handle members 42 is fixed in its position within the respective handle channel 34 (FIG. 7a). With further reference to FIG. 7a, a respective retraction pin 60 extends through a respective interlink channel 58 and into a respective handle channel 34 to a position adjacent a bottom end 46 of the outermost/lowermost handle member 44 when the wheel assembly 50 is at the deployed configuration, the retraction pin 60 being at the upper end 58b of the respective interlink channel 58. By comparison, a retraction pin 60 is downwardly displaced from the bottom end 46 of the lowermost handle member 44 when the wheel assembly 50 is at the withdrawn configuration, the retraction pin 60 being at the lower end 58b of the respective interlink channel 58 (FIGS. 5 and 7b).

It is noted that there are two means for causing the wheel assembly 50 to move between configurations. First, a user may manually pull outwardly on the axle 54 to deploy the wheels, such as by inserting his foot under the axle 54 and urging it outwardly. It may be returned to the withdrawn configuration by manually pushing it back inward. Another means of moving the wheel assembly 50 to the withdrawn configuration is to urge the handle assembly to the retracted configuration. As the handle members 42 are urged downwardly into the handle channels 34, a respective innermost/lowermost handle member 44 is moved downwardly below the bottom end 46 of the outermost (fixed) handle member 44 to bear against a respective retraction pin 60 and urge it downwardly in a respective interlink channel 58 (FIG. 7b). As described above, movement of the retraction pin 60 to a lower end of an interlink channel 58 pivots the mounting member 56 so as to move the wheel assembly 50 to the withdrawn configuration. This movement is also observed by comparing FIG. 7a to FIG. 7b.

In another aspect of the present invention, the mounting member 56 may also include a locking spring pin 62, also commonly known as a spring plunger, adjacent the retraction pin 60. The outermost handle member 44 defines an aperture (not shown) adjacent the bottom end 46 thereof. The locking spring pin 62 extends through the mounting member 56 and is biased to extend outwardly. Accordingly. when the mounting member 56 is pivoted to the position shown in FIGS. 1, 6a, and 7a, the locking spring pin 62 is configured to be received automatically into the aperture so as to prevent any further movement of the mounting member 56 until the locking spring pin 62 is released as will be discussed below. The effect of actuation of the locking spring pin 62, therefore, is to prevent any unintended movement of the wheel assembly 50 from the deployed configuration to the withdrawn configuration while it is being transported/rolled. In other words, the wheels will not surprisingly "retract" when in use.

As described previously, the retraction pin 60 is urged downwardly in the interlink channel 58 when the innermost handle member 48 is retracted which pivots the mounting member 56 to the position that urges the wheel assembly 50 to the withdrawn configuration. More particularly, the innermost handle member 48 slides through and below the bottom end 46 of the outermost handle member 44 as shown FIG. 7b. When this occurs, the innermost handle member 48 first contacts the locking spring pin 62 and dislodges it from the aperture—thus, disengaging the locking of the wheel assembly 50.

In use, the rolling car seat 10 may be strapped in to a vehicle seat by inserting a seat belt through the seat belt receiving slots 32 in a conventional manner. If, however, it is desired to remove the rolling car seat 10 from the vehicle and transport it to another location, whether to another vehicle or to a location for an entertainment event, the rolling car seat 10 may be removed from the vehicle and rolled to the desired location. Specifically, the wheel assembly 50 may be moved from a withdrawn configuration substantially in the recessed area 30 of the back portion 22 of the car seat 20 to a deployed configuration by urging it outwardly with a user's foot. This action results in the locking spring pin 62 being inserted into a lowermost handle member aperture, locking the wheel assembly 50 in the deployed configuration until specifically released by retraction of the innermost handle member 48, as described above.

Upon deployment of the wheel assembly 50, the handle assembly 40 may be automatically deployed if the user has not already grasped the handle bar 49 to do so. The car seat 20 may then be tipped slightly backward onto the wheels 52 and rolled or pushed by the handle bar 49 to the desired location. Finally, the car seat 20 may be tipped forwardly onto its bottom. The handle assembly 40 may be urged downwardly by the user into the handle channels 34 which automatically causes the wheel assembly to be released and urged to the withdrawn configuration.

It is understood that while certain forms of this invention have been illustrated and described, it is not limited thereto except insofar as such limitations are included in the following claims and allowable functional equivalents thereof.

The invention claimed is:

1. A rolling car seat, comprises:

a car seat having a back portion having upper and lower ends and a seat portion extending forwardly from said back portion lower end, said back portion and seat portion configured to receive an infant in a sitting position;

wherein said back portion includes a rear surface;

a handle assembly operatively coupled to said back portion and selectively movable between a retracted configuration not extending above said back portion upper end and an extended configuration extending above said back portion upper end;

a wheel assembly having a pair of spaced apart wheels operatively coupled to said back portion and selectively movable between a withdrawn configuration adjacent said back portion rear surface and a deployed configuration displaced from said back portion rear surface;

wherein:

said back portion defines a recessed area, said wheel assembly being substantially inside said recessed area at said withdrawn configuration and being substantially outside said recessed area at said deployed configuration;

said back portion defines opposed handle channels extending substantially between said back portion upper end and said back portion lower end, each handle channels being configured to slidably receive said handle assembly;

said handle assembly includes:

a plurality of handle members having a telescopic configuration so as to move between said retracted and said extended configurations; and a handle bar extending between upper ends of respective handle member by which said plurality of handle members are selectively urged by a user between said retracted and said extended configurations;

said wheel assembly includes a mounting member pivotally coupled to said back portion of said car seat and operatively coupled to a respective wheel of said pair of wheels so as to operatively connect said pair of wheels to said car seat; and a pivotal movement of said mounting member selectively causes said pair of wheels to move between said withdrawn and said deployed configurations;

said back portion of said car seat defines an interlink channel that communicates said recessed area with a respective handle channel, said interlink channel having upper and lower ends;

said mounting member includes a retraction pin extending away from an outer surface thereof, said retraction pin configured to extend through said interlink channel into said handle channel;

said retraction member being urged toward said interlink channel upper end when said mounting member is pivoted to move said pair of wheels to said deployed configuration; and said retraction member being urged toward said interlink channel lower end when said mounting member is pivoted to move said pair of wheels to said withdrawn configuration.

2. The car seat as in claim 1, further comprising a footrest operatively coupled to said seat portion and slidably movable between an inward configuration positioned inside said seat portion and an outward configuration extending forwardly away from said seat portion.

3. The car seat as in claim 2, wherein said footrest is substantially inside said seat portion at said inward configuration and is substantially outside said seat portion at said outward configuration.

4. The car seat as in claim 1, wherein said wheel assembly is at said withdrawn configuration when said handle assembly is at said retracted configuration.

5. The car seat as in claim 1, wherein said wheel assembly is moved automatically to said withdrawn configuration when said handle assembly is moved to said retracted configuration.

6. The car seat as in claim 1, wherein:

a lowermost handle member of said handle assembly is fixed in position in said handle channel;

said retraction pin is adjacent a bottom end of said lowermost handle member when said mounting member is pivoted to move said pair of wheels to said deployed configuration; and said retraction pin a displaced from said bottom end of said lowermost handle member when said mounting member is pivoted to move said pair of wheels to said withdrawn configuration.

7. The car seat as in claim 6, wherein:

said outermost handle member of said handle assembly defines an aperture adjacent said bottom end thereof;

said wheel assembly includes a locking spring pin extending through said mounting member and through said interlink channel into said handle channel; and said locking spring pin is configured to register with said aperture in said outermost handle member when said retraction pin is adjacent said bottom end of said outermost handle member so as to lock said wheel assembly at said deployed configuration.

8. The car seat as in claim 7, wherein said locking spring pin is released from said aperture when an inner handle member is moved downwardly below said bottom end as said handle assembly is moved to said retracted configuration.

9. The car seat as in claim 1, wherein an inner handle member situated in said outermost handle member selectively urges said retraction pin toward said interlink channel lower end when said handle assembly is moved toward said retracted configuration so as to move said wheel assembly toward said withdrawn configuration.

10. The car seat as in claim 1, wherein said plurality of handle members are slidable relative to one another in a generally friction fit arrangement.

11. The car seat as in claim 1, wherein said pair of wheels are axially coupled to respective mounting members so that said pair of wheels are free to rotate.

12. The car seat as in claim 1, further comprising a padded material situated on front surfaces of said back portion and said seat portion, respectively.

* * * * *